(12) United States Patent
Jachner

(10) Patent No.: US 9,065,918 B2
(45) Date of Patent: Jun. 23, 2015

(54) THIRD PARTY CALL CONTROL UTILIZING A VOICE USER INTERFACE

(75) Inventor: Jack Jachner, Lexington, MA (US)

(73) Assignee: Alcatel Lucent, Boulogne-Billancourt (FR)

( * ) Notice: Subject to any disclaimer, the term of this patent is extended or adjusted under 35 U.S.C. 154(b) by 2380 days.

(21) Appl. No.: 11/554,006

(22) Filed: Oct. 28, 2006

(65) Prior Publication Data

US 2008/0102808 A1 May 1, 2008

(51) Int. Cl.
*H04W 24/00* (2009.01)
*H04M 3/56* (2006.01)
*H04M 7/12* (2006.01)
*H04M 7/06* (2006.01)

(52) U.S. Cl.
CPC . *H04M 3/56* (2013.01); *H04M 7/06* (2013.01); *H04M 7/1235* (2013.01); *H04M 2203/5063* (2013.01); *H04M 2207/18* (2013.01)

(58) Field of Classification Search
USPC ............... 455/416, 417, 432, 445, 456.3; 370/261; 379/210.01
See application file for complete search history.

(56) References Cited

U.S. PATENT DOCUMENTS

| | | | | |
|---|---|---|---|---|
| 5,311,583 A * | 5/1994 | Friedes et al. | ........... | 379/210.01 |
| 5,390,233 A * | 2/1995 | Jensen et al. | .................. | 455/417 |
| 5,883,964 A * | 3/1999 | Alleman | .................. | 379/205.01 |
| 6,035,215 A * | 3/2000 | Goni et al. | ..................... | 455/557 |
| 6,993,360 B2 * | 1/2006 | Plahte et al. | .................. | 455/555 |
| 2002/0132638 A1* | 9/2002 | Plahte et al. | .................. | 455/555 |
| 2003/0043787 A1* | 3/2003 | Emerson, III | ................ | 370/352 |
| 2003/0055899 A1* | 3/2003 | Burger et al. | ................ | 709/205 |
| 2003/0118007 A1* | 6/2003 | Williams et al. | ............. | 370/352 |
| 2004/0072593 A1* | 4/2004 | Robbins et al. | .............. | 455/560 |
| 2004/0125933 A1* | 7/2004 | Jun et al. | .................. | 379/202.01 |
| 2004/0218744 A1* | 11/2004 | Nguyen et al. | ........... | 379/202.01 |
| 2005/0014490 A1* | 1/2005 | Desai et al. | .................... | 455/416 |
| 2005/0148362 A1* | 7/2005 | Jagadeesan et al. | ......... | 455/555 |
| 2006/0114845 A1* | 6/2006 | Minborg | ........................ | 370/260 |
| 2006/0128388 A1* | 6/2006 | Mason et al. | ................. | 455/445 |
| 2006/0188084 A1* | 8/2006 | Rogers et al. | ............. | 379/265.01 |
| 2007/0111743 A1* | 5/2007 | Leigh et al. | ................... | 455/518 |
| 2007/0197224 A1* | 8/2007 | Winkler | ........................ | 455/445 |
| 2007/0201646 A1* | 8/2007 | Metcalf | ..................... | 379/142.01 |
| 2007/0237321 A1* | 10/2007 | Bloebaum et al. | ............ | 379/252 |
| 2007/0298771 A1* | 12/2007 | Mottes | ........................ | 455/414.1 |
| 2008/0084868 A1* | 4/2008 | Brehm | .......................... | 370/352 |
| 2008/0102808 A1* | 5/2008 | Jachner | .......................... | 455/420 |

* cited by examiner

*Primary Examiner* — Marcos Batista
(74) *Attorney, Agent, or Firm* — Capitol Patent Trademark Law Firm, PLLC

(57) ABSTRACT

A method is described herein which enables a person to use their mobile phone to establish a voice connection with a central server, then send call control information in-band in the voice channel (via a voice user interface (VUI), digital tone multi-frequency (DTMF) or Multi-Frequency (MF) signaling) to setup a call between a convenient phone (e.g., land-line phone or mobile phone which has a better tariff structure) and one or more destination phone(s). Once the call is setup, the mobile phone can be hung-up to save on mobile connection costs and then a person can use the convenient phone to talk to a person using the destination phone.

23 Claims, 4 Drawing Sheets

THIRD PARTY CALL CONTROL UTILIZING A VOICE USER INTERFACE

BACKGROUND OF THE INVENTION

1. Field of the Invention

The present invention is related to a method for enabling a person to use their mobile phone to setup a call between a near land-line phone (which the person will utilize instead of the mobile phone) and a called party's phone.

2. Description of Related Art

Referring to FIG. 1 (PRIOR ART), there is a diagram which is used to help explain today's price structure that is associated with using a mobile phone 102 to make a call to another mobile phone 104, a land-line phone 106 or an enterprise phone 108. In one scenario, assume the mobile phone 102 is located in a public network A (in this example a home network) and is used to make an outbound call 110 to the mobile phone 104 which is located in a public network B (in this example an international network). The user of mobile phone 102 would be charged a "high" price for making an international mobile call 110 to mobile phone 104. In contrast, if the user had used a land-line phone instead of the mobile phone 102 to make this international call then they would have been charged a much "lower" price.

In another scenario, assume the mobile phone 102 is located in a public network A (in this example an international network) and is used to make an outbound call 112 to the land-line phone 106 which is located in a public network B (in this example a home network). The user of mobile phone 102 would be charged a "high" price for making a roaming international mobile call to the land-line phone 106. In contrast, if the user had used a land-line phone instead of the mobile phone 102 to make the international call then they would not have been charged for mobile roaming plus they would have been charged a much "lower" price.

In yet another scenario, assume the mobile phone 102 is located in a public network A (in this example an international network) and is used to make a conference call 114 to the land-line phone 106 which is located in a public network B (in this example a home network) and to the enterprise phone 108 which is associated with an enterprise switch 116 (e.g., private branch exchange (PBX) 116) that is located in a private network C. In this case, the user of mobile phone 102 would be charged a "high" price and double minutes for making a roaming international mobile conference call to both the land-line phone 106 and the enterprise phone 108. In contrast, if the user had used a land-line phone instead of the mobile phone 102 to make the conference call then they would not have used twice the minutes plus they would have been charged a much "lower" price.

Of course, there are many other scenarios which have not been discussed herein in which the user of the mobile phone 102 would be charged a relatively "high" fee for making an outbound call and/or receiving an inbound call. In contrast, it is usually relatively inexpensive for a user to use a land-line phone rather than their mobile phone 102 to make calls both nationally and internationally. Thus, there has been in interest in reducing the costs associated with using the mobile phone 102 by enabling a user of the mobile phone 102 to take advantage of today's price structure that is associated with land-line phone calls. One service that addresses this need is known as Cellular Extension and is used today by businesses to help them reduce the mobile costs associated with their employees using the company's mobile phones. A brief explanation describing the known Cellular Extension service is provided next with respect to FIG. 2 (PRIOR ART).

Referring to FIG. 2 (PRIOR ART), there is a diagram which is used to help discuss the basic features/drawbacks that are associated with the known Cellular Extension service (which was developed by Alcatel). Basically, the user of a mobile phone 202 located in a public network A would make a voice call 204 to a PBX 206 which is located in a private network C. The PBX 206 would recognize the user of the mobile phone 202 and would provide the user with a dial tone which originates at the PBX 206. Then, the user could use their mobile phone 202 and that dial tone to make a call to another mobile phone 208 (located in public network B), a land-line phone 210 (located in public network B), or an enterprise phone 212 (associated with the PBX 206). In particular, the user of the mobile phone 202 could respond to a voice prompt from the PBX 206 and inform the PBX 206 that they want to call the land-line phone 210 (for instance) and then say the telephone number of the land-line phone 210 or use Dual Tone Multi-Frequency (DTMF) signals (i.e., press buttons on the mobile phone 102) to indicate the telephone number of the land-line phone 210. The PBX 206 would then establish a voice call 214 and connect the mobile phone 202 to the land-line phone 210. As can be seen, there are two voice connections 204 and 214 which are used to connect the mobile phone 202 to the land-line phone 210.

An advantage of this service is that the voice connection 214 between the PBX 206 and the land-line phone 210 is not a mobile call and as such is not charged as being a mobile call. However, the user of the mobile phone 202 is still charged for using minutes and possibly roaming (if the public network A is not their home network or is an international network) while they use the voice connection 204 for the duration of the call to the land-line phone 210. To address this drawback, Sonamobile Inc. has introduced a service known as Call Master which enables a person to use their mobile phone to setup a call between a near land-line phone (which the person will later utilize instead of their mobile phone) and a called party's phone. A brief explanation describing the known Call Master service is provided next with respect to FIG. 3 (PRIOR ART).

Referring to FIG. 3 (PRIOR ART), there is a diagram which is used to help discuss the basic features/drawbacks that are associated with the known Call Master service. Basically, the user of a mobile phone 302 ("smart" mobile phone 302) located in a public network A would make a data call 304 to a server 305 (e.g., Alcatel's Advance Communication Server 305) which is associated with a PBX 306 shown located in a private network C. Once the user of the mobile phone 302 contacts the server 306 then they can inform the server 305 that they want to call a mobile phone 308 (which is shown located in a public network B). Alternatively, the user of the mobile phone 302 can inform the server 305 that they want to call a land-line phone 310 (located in public network B), or an enterprise phone 312 (associated with the PBX 306).

More specifically, the user of the mobile phone 302 would use a graphical user interface (GUI) and possibly a menu in their mobile phone 302 to send the telephone number of the mobile phone 308 over the data channel 304 to the server 305. In addition, the user of the mobile phone 302 would use the GUI and possibly the menu in their mobile phone 302 to send the telephone number of a convenient phone 311 (which is typically a land-line phone 311 that they will use to talk with a person associated with mobile phone 308) over the data channel 304 to the server 305. Generally, the user would interface with their phone directory in the mobile phone 302 to select and send the telephone numbers of the destination mobile phone 308 and the convenient phone 311 over the data channel 304 to the server 305 (typically 1-2 Kb of bandwidth on the data channel 304 would be used to send this information to the server 305).

At this point, the server 305 would instruct the PBX 306 to establish a voice connection 312 between itself and the convenient phone 311 and to establish a voice connection 314 between itself and the destination mobile phone 308. Thereafter, the user of the mobile phone 302 would discontinue the data call 304 to the server 305 and use the convenient phone 311 to talk via the voice connections 312 and 314 with the user of the destination mobile phone 310. An advantage of this service is that the user would use the "less expensive" convenient land-line phone 311 (and not their mobile phone 302) to talk with the user of destination mobile phone 308 (or destination phones 310 and 312). Another advantage of this service is that the user of the mobile phone 302 would not use any of their voice minutes to setup the call with the server 305. However, this service has several drawbacks including (for example): (1) not all mobile phones 302 have the capability to setup and use a data channel 304; (2) not all networks have a data capability that is commonly associated with 3G, General Packet Radio Service (GPRS), Enhance Data Rate for GSM Environment (EDGE) etc.; and (3) the user of the mobile phone 302 needs to subscribe and pay a fee to use a data service that is associated with 3G, GPRS, EDGE, etc. . . . . Accordingly, there is a need to address these shortcomings and other shortcomings which are associated with the known services like the Cellular Extension service and the Call Master service. This particular need and other needs are satisfied by the present invention.

BRIEF DESCRIPTION OF THE INVENTION

The present invention is related to a method for enabling a person to use their mobile phone to setup a call between a convenient phone (which the person will utilize instead of the mobile phone) and a destination phone. In one embodiment, the method includes the following steps: (1) establishing a voice connection between the mobile phone and a third party call control server; (2) providing a telephone number of a convenient phone over the voice connection to the third party call control server; (3) providing a telephone number of a destination phone over the voice connection to the third party call control server such that the third party call control server is able to interact with a phone switch and have a voice connection established between the convenient phone and the destination phone; (4) disconnecting the voice connection between the mobile phone and the third party call control server; and (5) allowing the person to use the convenient phone to have a teleconference with a user of the destination phone.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
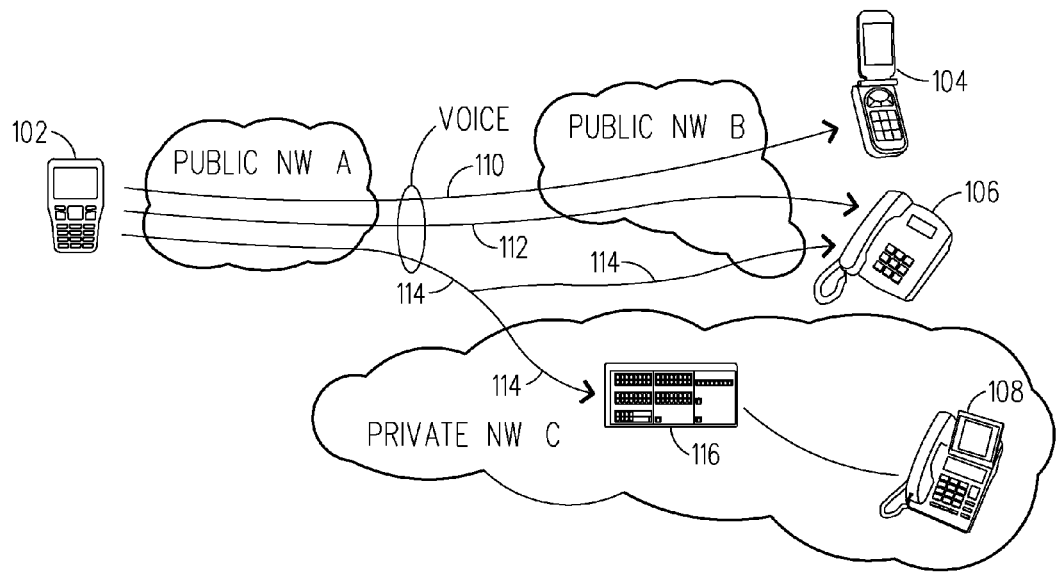
FIG. 1 (PRIOR ART) is a diagram used to help explain today's price structure which is associated with using a mobile phone to make a call to another mobile phone, a land-line phone or an enterprise phone.
Figure 2:
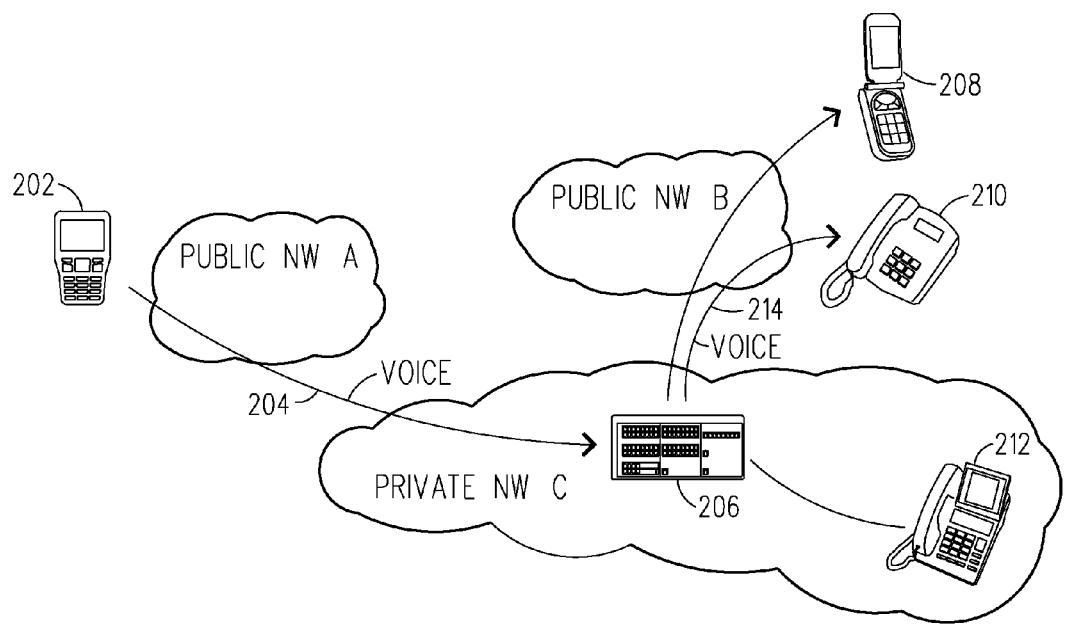
FIG. 2 (PRIOR ART) is a diagram used to help explain the basic features/drawbacks which are associated with the known Cellular Extension service.
Figure 3:
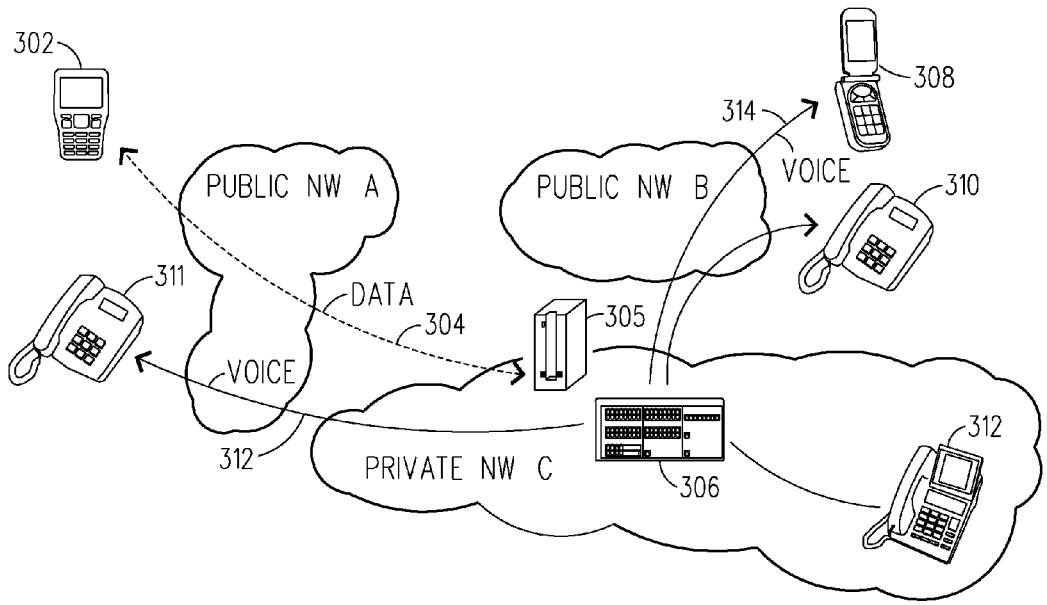
FIG. 3 (PRIOR ART), there is a diagram used to help explain the basic features/drawbacks which are associated with the known Call Master service.
Figure 4:
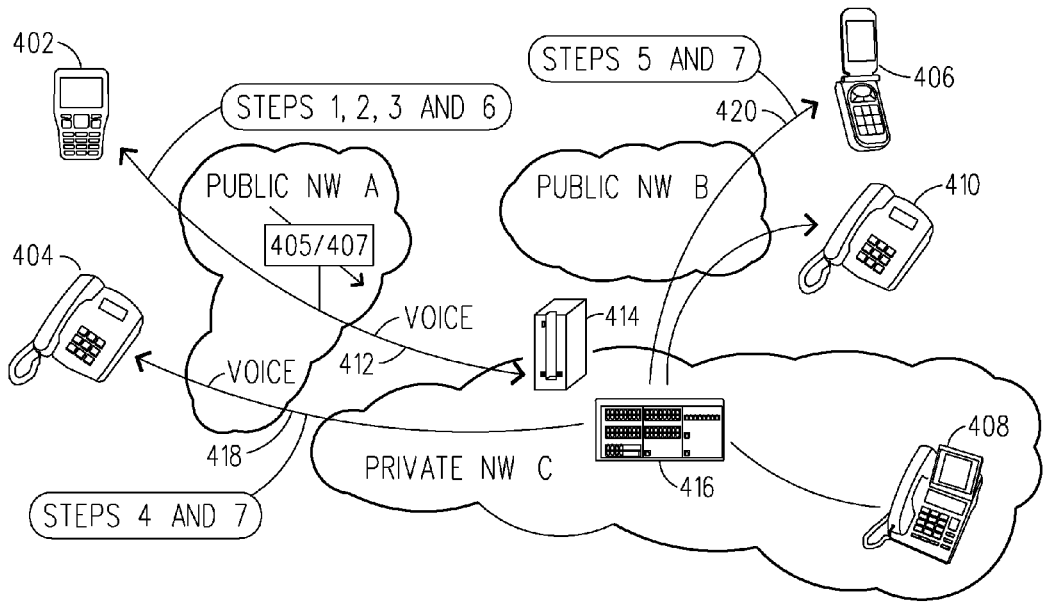
FIG. 4 is a diagram used to help explain a method for enabling a person to use their mobile phone to setup a voice call between a convenient phone (which the person will utilize instead of their mobile phone) and a destination phone in accordance with the present invention.

Referring to FIG. 4, there is a diagram which is used to help discuss a method for enabling a person to use their mobile phone 402 to setup a voice call between a convenient land-line phone 404 (which the person will utilize instead of the mobile phone 402) and a called party's phone 406, 408 or 410 in accordance with the present invention. Basically, the user of the mobile phone 402 which is currently located in a public network A would make a voice call 412 to a server 414 (e.g., Alcatel's Advance Communication Server 414) which is associated with a PBX 416 (or other type of phone switch 416) that is located in a private network B (or other public network) (step 1). Once, the user of the mobile phone 402 contacts the server 414 they can respond to a voice prompt or in the alternative simply inform the server 414 (by pressing a button associated with a GUI) that they want to use a third party call control feature so they can setup a call between the convenient land-line phone 404 and a destination phone 406, 408 or 410.

Thereafter, the user of the mobile phone 402 would receive another voice prompt from the server 414/PBX 416 such as "press 1 to input the phone number of the destination phone" and then the user would press 1 and subsequently say or use DTMF signals to provide a telephone number 405 of the destination phone 406, 408 or 410 (step 2). Alternatively, the user of the mobile phone 402 could interact with a GUI (running specialized application software) to select the telephone number 405 of the destination phone 406, 408 or 410 which is stored in their personal directory so as to provide that telephone number 405 to the server 414/PBX 416 (step 2). In this particular example, the user of the mobile phone 402 wants to call the mobile phone 406 which is located in a public network B. Alternatively, the user of the mobile phone 402 could inform the server 414 that they want to call a land-line phone 408 (located in public network B), or an enterprise phone 410 (associated with the PBX 416).

Then, the user of the mobile phone 402 would receive another voice prompt from the server 414/PBX 416 such as "press 2 to provide the phone number of the convenient phone" and then the user would press 2 and subsequently say or use DTMF signals to provide a telephone number 407 of the convenient phone 404 (step 3). Alternatively, the user of the mobile phone 402 could interact with a GUI (running specialized application software) to select the telephone number 407 of the convenient phone 404 which is stored in their personal directory so as to provide that telephone number 407 to the server 414/PBX 416 (step 3). Typically, the convenient phone 404 would be a land-line phone 404 which is located in the same room or is at least located relatively close to the user of the mobile phone 402. But, the convenient phone 404 can also be any type of communication device including, for example, a mobile phone (which has a desirable tariff structure), a hotel phone or an enterprise phone.

If desired, once the user provides the telephone number 407 of the convenient phone 404 then this telephone number could be stored and used by the server 414 for subsequent calls until the user decides to change and use a new convenient phone. In this case, the user of the mobile phone 402 could receive a voice prompt from the server 414/PBX 416 such as "press 3 to change the phone number of the convenient phone" and then the user would press 3 and subsequently say or use DTMF signals to provide the telephone number of the new convenient phone. Alternatively, the user of the mobile phone 402 could interact with a GUI (running specialized application software) to select the telephone number of the new convenient phone which would be stored in their personal directory so as to provide that telephone number to the server 414/PBX 416. Of course, the server 414 would be able to store the telephone numbers of convenient phones for a large number users.

At this point, the server 414 has the telephone number 407 of the convenient phone 404 and would instruct the PBX 416 to first establish a voice connection 418 between itself and the convenient phone 404 (step 4). Once the user picks up the convenient phone 404 to establish the voice connection 418, the server 414 would then instruct the PBX 416 to use the telephone number 405 of the destination phone 406 to establish a voice connection 420 with the destination phone 406 (step 5). Then, the user of the mobile phone 402 would discontinue the voice call 412 to the server 414/PBX 416 (step 6) and use the convenient phone 404 to talk via the voice connections 418 and 420 to the user of the destination phone 406 (step 7). If needed, the server 414/PBX 416 could use an automated voice to let the user of the destination phone 406 know that a person named "John Smith" is attempting to call them and will be on the line in a short amount of time, and if desired enable the user of the destination phone 406 to confirm their desire to accept the call by asking them for a specific voice response or asking them to input a specific DTMF.

There are several advantages associated with the present invention including (for example): (1) the user (or their employer) of the mobile phone 402 would only be charged for using minutes and possibly roaming (if the public network A is not their home network or is an international network) for the time it takes to establish the call between the convenient phone 404 and the destination phone 406; and (2) the user (or their employer) would have to pay a much lower fee for the voice connections 418 and 420 to the convenient phone 404 and the destination phone 406 than if the mobile phone 402 was used to call the destination phone 406. Plus, the present invention is a marked improvement over the known Call Master service in that it allows the user of the mobile phone 402 to have a third party call control feature without needing a data subscription or having to establish a data connection with a data network. Moreover, the mobile phone 402 used in the present invention can be but does not have to be a "smart" mobile phone 402 which is capable of interacting with a data network as is needed with the known Call Master service.

Figure 5:
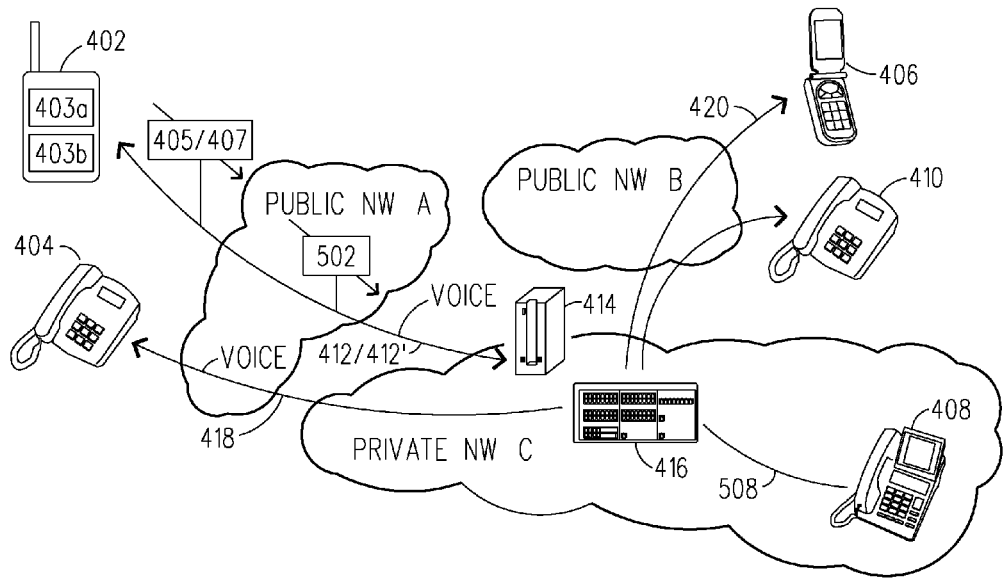
FIG. 5 is a diagram used to help explain how the user of the mobile phone can also setup a conference call (and in particular a mid-call conference call) between the convenient phone and multiple destination phones in accordance with the present invention.

Referring to FIG. 5, there is a diagram which is used to help describe an additional feature of the present invention where the user of the mobile phone 402 can setup a conference call (and in particular a mid-call conference call) between the convenient phone 404 and multiple destination phones 406, 408 and 410. To accomplish this, the user would use their mobile phone 402 which includes a processor 403a and a memory 403b that has instructions stored therein which are accessible and able to be processed by the processor 403a to perform the following: (1a) establish a voice connection 412 with the server 414 (third party call control server 414); (2a) provide a telephone number 407 of the convenient phone 404 over the voice connection 412 to the server 414; (3a) provide a telephone number 405 of the first destination phone 406 over the voice connection 412 to the server 414 such that the server is able to have the PBX 416 (or other type of phone switch 416) establish the voice connection 418/420 between the convenient phone 404 and the destination phone 406; (4a) disconnect the voice connection 412 between the mobile phone 402 and the server 414; and (5a) use the convenient phone 404 to have a teleconference with another person who is using the first destination phone 406. This is the same situation that was reached during the earlier discussion with respect to FIG. 4 but in this case the user of the mobile phone 402 now wants to add another party to the on-going call.

To accomplish this, the user would use their mobile phone 402 to: (6a) re-establish a voice connection 412' with the server 414 (which recognizes the mobile phone 402 and knows there is an existing voice connection 418/420 between the convenient phone 404 and the first destination phone 406); (7a) provide a telephone number 502 of a second destination phone 408 (for example) over the re-established voice connection 412' to the server 414 so that the server 414 can have the PBX 416 establish another voice connection 508 and connect the second destination phone 408 to the previously established voice connection 418/420 between the convenient phone 404 and the first destination phone 404; (8a) disconnect the voice connection 412' between the mobile phone 402 and the server 414; and (9a) use the convenient phone 404 to have a three-way conference call with the people using the two destination phones 406 and 408. Of course, the person using the mobile phone 402 could setup the conference call with the people using the two destination phones 406 and 408 in the beginning of the process at step 3a by providing the server 414 with both of the telephone numbers 504 and 506 for the two destination phones 406 and 408. In addition, the person using the mobile phone 402 could if they wanted to repeat steps 6a-9a and setup a conference call between the convenient phone 404 and one or more additional destination phone(s) 410 (for example).

Figure 6:
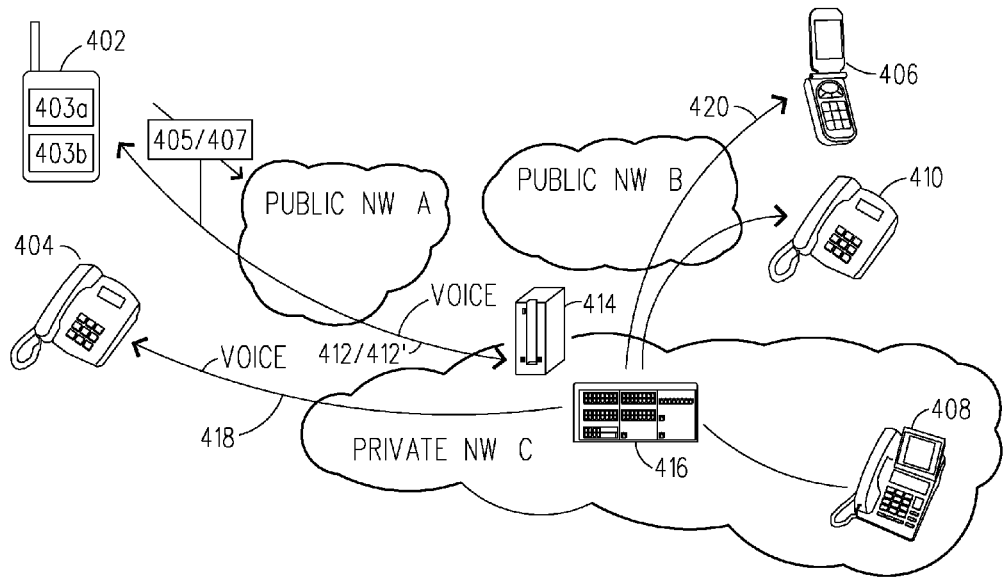
FIG. 6 is a diagram used to help explain how the user of the mobile phone can establish a voice connection between the convenient phone and the destination phone and then switch the voice connection from the convenient phone back to their mobile phone in accordance with the present invention.

Referring to FIG. 6, there is a diagram which is used to help describe an additional feature of the present invention where the user of the mobile phone 402 can establish a voice connection between the convenient phone 404 and the destination phone 406 and then switch the voice connection from the convenient phone 404 back to their mobile phone 402. To accomplish this, the user would use their mobile phone 402 which includes a processor 403a and a memory 403b that has instructions stored therein which are accessible and able to be processed by the processor 403a to perform the following: (1b) establish a voice connection 412 with the server 414 (third party call control server 414); (2b) provide a telephone number 407 of the convenient phone 404 over the voice connection 412 to the server 414; (3b) provide a telephone number 405 of the destination phone 406 over the voice connection 412 to the server 414 such that the server is able to have the PBX 416 (or other type of phone switch 416) establish the voice connection 418/420 between the convenient phone 404 and the destination phone 406; (4b) disconnect the voice connection 412 between the mobile phone 402 and the server 414; and (5b) use the convenient phone 404 to have a teleconference with another person who is using the destination phone 406. This is the same situation that was reached during the earlier discussion with respect to FIG. 4 but in this case the user of the mobile phone 402 now decides that they want to switch the teleconference back to their mobile phone 402.

To accomplish this, the user would use their mobile phone 402 to: (6b) re-establish a voice connection 412' with the server 414 (which recognizes the mobile phone 402 and knows there is an existing voice connection 418/420 between the convenient phone 404 and the first destination phone 406); (7b) request that the server 414 have the PBX 416 connect the mobile phone 402 to the voice connection 418/420 established between the convenient phone 404 and the destination phone 406; (8b) disconnect the voice connection 418 between the convenient phone 404 and the PBX 416; and (9b) use the mobile phone 402 to have a teleconference with another person who is using the destination phone 406. In particular, the PBX 416 would use the voice connections 412'/420 to connect the mobile phone 402 to the destination phone 406. This feature is desirable since it allows the user to become mobile again once they change the voice leg and connect the on-going call to their mobile phone 402.

Figure 7:
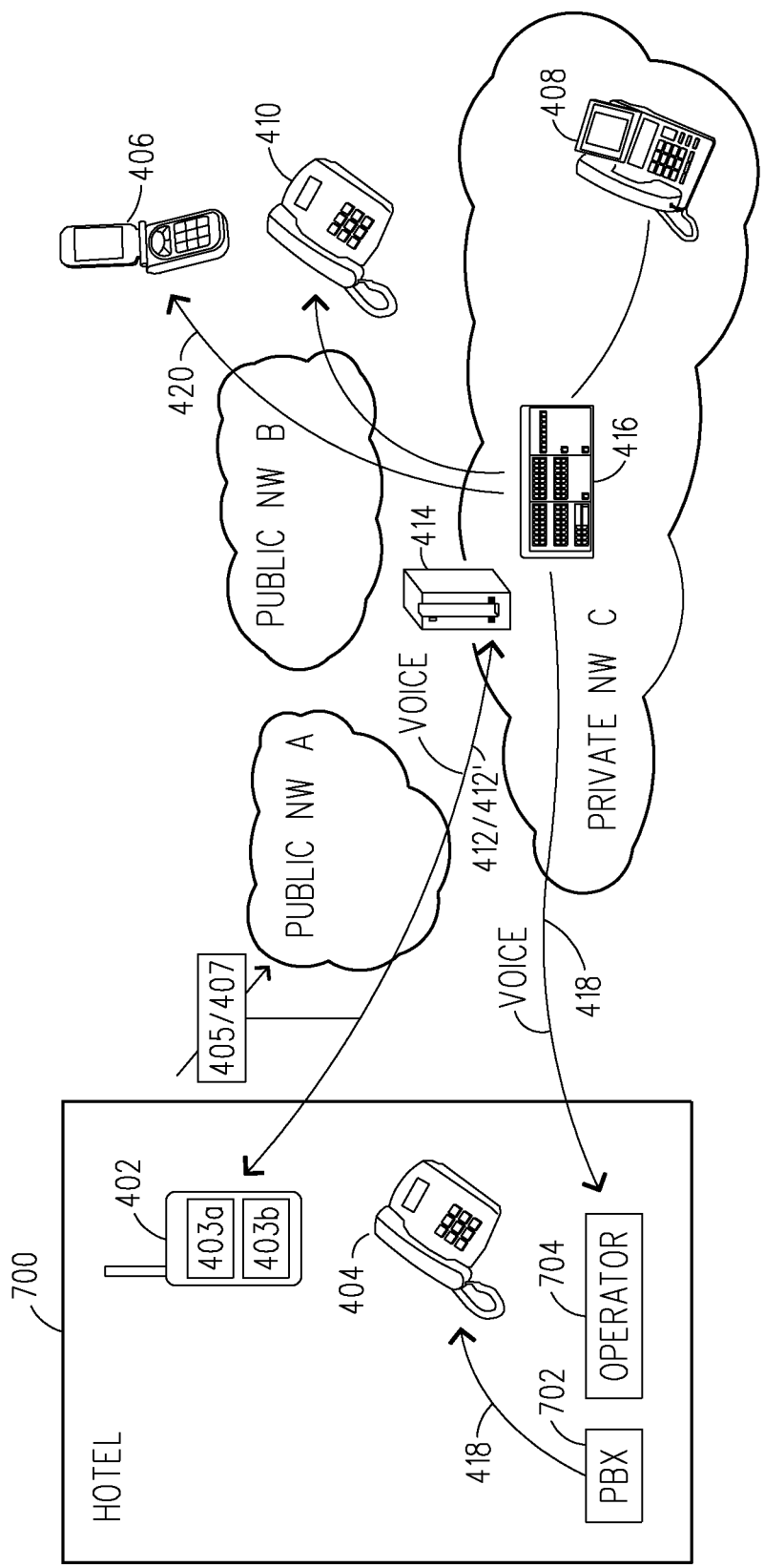
FIG. 7 is a diagram used to help explain an additional feature of the present invention which can be used if the user of the mobile phone happens to be located in a hotel (which has a PBX/hotel operator) and wants to use the hotel's phone in their room as the convenient phone.

Referring to FIG. 7, there is a diagram which is used to help describe an additional feature of the present invention that can be used if the user of the mobile phone 402 happens to be located in a hotel 700 (which has a PBX 702/hotel operator 704) and wants to use the hotel's phone which is located in their room as the convenient phone 404. To accomplish this, the user would use their mobile phone 402 which includes a processor 403a and a memory 403b that has instructions stored therein which are accessible and able to be processed by the processor 403a to perform the following: (1c) establish a voice connection 412 with the server 414 (third party call control server 414); (2c) provide a telephone number 407 of the convenient phone 404 (which is really the general telephone number associated with the hotel 700) over the voice connection 412 to the server 414; (3c) provide a telephone number 405 of the destination phone 406 over the voice connection 412 to the server 414; (4c) request that the server 414 have the PBX 416 (or other type of phone switch 416) establish the voice connection 418/412 between the hotel 700 and the mobile phone 402 (at this point the user can use their mobile phone 402 talk to a hotel operator 704 and have the hotel operator 704 use their PBX 702 to connect the incoming call from the server 414/PBX 416 to the convenient phone 404); (5c) request that the server 414 have the PBX 416 (or other type of phone switch 416) establish the voice connection 418/420 between the convenient phone 404 and the destination phone 406; (6c) disconnect the voice connection 412 between the mobile phone 402 and the server 414; and (7c) use the convenient phone 404 to have a teleconference with another person who is using the destination phone 406. This feature is desirable since it allows the user to use their mobile phone 402 to communicate with the hotel operator 704 so they can have the incoming call connected to the convenient phone 404. This feature is not possible with the traditional Call Master service because the user needs to have their mobile phone operating in a data mode rather than a voice mode when establishing a voice connection between the convenient phone 404 and the destination phone 406. Thus, the user would not be able to use their mobile phone to talk to the hotel operator 704 and ask them to forward the incoming call to the convenient phone 404. Note: the call is inbound to hotel phone 404 and hence is typically not billed to the guest by the hotel operator 704, in contrast to outbound calls made on the hotel phone 704 where the hotel guest would be billed to make that call. This is desirable with this specific feature of the present invention.

From the foregoing, it should be appreciated that a person can use their mobile phone to establish a voice connection with a central server, then send call control information in-band in the voice channel (via a Voice User Interface (VUI), DTMF or Multi-Frequency (MF) signaling) to setup a call between a convenient phone (e.g., land-line phone or mobile phone which has a better tariff structure) and a destination phone. Once the call is setup, the mobile phone can be hung-up to save on mobile connection costs and the person can use the convenient phone to talk to a person using the destination phone. If further call management is required, e.g. a third party needs to be added midway in the call, then the user can use their mobile phone to call the central server and send more call management commands in-band on the voice channel to establish a three-way conference call between the convenient phone and multiple destination phones. Voice prompts may be used to guide the user through the phone management, or a GUI application may be provisioned on the mobile phone to facilitate user interaction with the central server.

Although multiple embodiments of the present invention have been illustrated in the accompanying drawings and described in the foregoing detailed description, it should be understood that the invention is not limited to the embodiments disclosed, but is capable of numerous rearrangements, modifications and substitutions without departing from the spirit of the invention as set forth and defined by the following claims.

What is claimed is:

1. A method for enabling a person using a mobile phone to have third party call control, said method comprising the steps of:
   establishing a voice connection between the mobile phone and a third party call control server;
   providing a telephone number of a destination phone over the voice connection to the third party call control server;
   providing a telephone number of a convenient phone over the voice connection to the third party call control server such that the third party call control server is able to interact with a phone switch to establish a connection between the convenient phone and the phone switch;
   establishing a voice connection through the phone switch between the convenient phone and the destination phone; and
   disconnecting the voice connection between the mobile phone and the third party call control server after the establishment of the voice connection between the convenient phone and the destination phone.

2. The method of claim 1, further comprising providing the telephone numbers of the convenient phone and the destination phone using DTMF or voice signals.

3. The method of claim 2, further comprising providing the telephone numbers of the convenient phone and the destination phone using a graphical user interface.

4. The method of claim 1, further comprising storing the telephone number of the convenient phone at the third party call control server for future use.

5. The method of claim 1, wherein when said convenient phone is a hotel phone.

6. The method of claim 1, further comprising the steps of:
re-establishing a voice connection between the mobile phone and the third party call control server;
providing a telephone number of an additional destination phone over the re-established voice connection to the third party call control server so that the third party call control server is able to interact with the phone switch and have the additional destination phone connected to the voice connection which is established between the convenient phone and the destination phone.

7. The method of claim 1, further comprising the steps of:
re-establishing a voice connection between the mobile phone and the third party call control server;
allowing the person using the mobile phone to request that the third party call control server have the phone switch connect the mobile phone to the voice connection established between the convenient phone and the destination phone; and
disconnecting the convenient phone from the voice connection that is now established between the mobile phone and the destination phone.

8. The method of claim 1, wherein said destination phone is:
a mobile phone;
a land-line phone; or
an enterprise phone.

9. The method of claim 1, wherein said convenient phone is:
a mobile phone which has a desirable tariff structure;
a land-line phone;
a hotel phone; or
an enterprise phone.

10. A mobile phone, comprising:
a processor; and
a memory with instructions stored therein which are accessible and processable by said processor, the processor operable to:
establish a voice connection with a third party call control server;
provide a telephone number of a destination phone over the voice connection to the third party call control server;
provide a telephone number of a convenient phone over the voice connection to the third party call control server such that the third party call control server is able to interact with a phone switch and establish a connection between the convenient phone and the voice switch;
establish a voice connection through the voice switch between the convenient phone and the destination phone; and
disconnect the voice connection between the mobile phone and the third party call control server after the establishment of the voice connection between the convenient phone and the destination phone.

11. The mobile phone of claim 10, wherein said processor is operable to provide the telephone numbers of the convenient phone and the destination phone using DTMF or voice signals.

12. The mobile phone of claim 10, wherein said processor facilitates the providing steps by enabling the user to interact with a graphical user interface so they can use their phone directory to provide the telephone numbers of the convenient phone and the destination phone to the third party call control server.

13. The mobile phone of claim 10, wherein when said convenient phone is a hotel phone.

14. The mobile phone of claim 10, wherein said processor is further operable to:
re-establish a voice connection with the third party call control server;
provide a telephone number of an additional destination phone over the re-established voice connection to the third party call control server so that the third party call control server is able to interact with the phone switch;
disconnect the re-established voice connection with the third party call control server; and
establish a voice connection among the convenient phone, the destination phone and the additional destination phone.

15. The mobile phone of claim 10, wherein said processor is further operable to:
re-establish a voice connection with the third party call control server; and
request the third party call control server to have the phone switch connect the mobile phone to the voice connection established between the convenient phone and the destination phone so that the user can disconnect the convenient phone and then use the mobile phone to continue the teleconference with the person that is using the destination phone.

16. The mobile phone of claim 10, wherein said destination phone is:
a mobile phone;
a land-line phone; or
an enterprise phone.

17. The mobile phone of claim 10, wherein said convenient phone is:
a mobile phone which has a desirable tariff structure;
a land-line phone;
a hotel phone; or
an enterprise phone.

18. A third party call control server operable to:
receive a voice call from a mobile phone;
receive a telephone number of a convenient phone during the voice call with the mobile phone;
receive a telephone number of a destination phone during the voice call with the mobile phone;
interact with a phone switch to establish a voice connection with the convenient phone;
interact with a phone switch to establish a voice connection between the convenient phone and the destination phone; and
disconnect the voice call from the mobile phone after the establishment of the voice connection between the convenient phone and the destination phone.

19. The third party call control server of claim 18, further operable to store the telephone number of the convenient phone.

20. The third party call control server of claim 18, further operable to:
receive another voice call from the mobile phone;
receive a telephone number of another destination phone during another voice call with the mobile phone;
interact with the phone switch to connect the additional destination phone to the voice connection which is established between the convenient phone and the destination phone such that the user can disconnect the mobile phone and then use the convenient phone to have a three-way conference call with users of the destination phone and the additional destination phone.

21. The third party call control server of claim 18, further operable to:
- receive another voice call from the mobile phone;
- receive instructions during the another voice call from the mobile phone requesting that the mobile phone be connected to the voice connection established between the convenient phone and the destination phone; and
- interact with the phone switch to connect the mobile phone to the voice connection established between the convenient phone and the destination phone so that the user can disconnect the convenient phone and then use the mobile phone to continue the teleconference with the user of the destination phone.

22. The third party call control server of claim 18, wherein said convenient phone is:
- a mobile phone which has a desirable tariff structure;
- a land-line phone;
- a hotel phone; or
- an enterprise phone.

23. The third party call control server of claim 18, wherein said destination phone is:
- a mobile phone;
- a land-line phone; or
- an enterprise phone.

* * * * *